United States Patent
Delius et al.

(10) Patent No.: US 10,959,440 B2
(45) Date of Patent: Mar. 30, 2021

(54) SMOKE- AND WATER VAPOUR-PERMEABLE FOOD CASING WITH OPTIMIZED BONDING PROPERTIES

(71) Applicant: Kalle GmbH, Wiesbaden (DE)

(72) Inventors: Ulrich Delius, Frankfurt (DE); Igor Raskita, Wiesbaden (RU)

(73) Assignee: Kalle GmbH, Wiesbaden (DE)

( * ) Notice: Subject to any disclaimer, the term of this patent is extended or adjusted under 35 U.S.C. 154(b) by 140 days.

(21) Appl. No.: 16/256,705

(22) Filed: Jan. 24, 2019

(65) Prior Publication Data

US 2019/0230942 A1    Aug. 1, 2019

(30) Foreign Application Priority Data

Jan. 26, 2018    (DE) .................. 10 2018 201 241.5

(51) Int. Cl.
  B32B 27/08   (2006.01)
  B32B 27/34   (2006.01)
  A22C 13/00   (2006.01)

(52) U.S. Cl.
  CPC .......... *A22C 13/0013* (2013.01); *B32B 27/08* (2013.01); *B32B 27/34* (2013.01); *A22C 2013/002* (2013.01); *A22C 2013/003* (2013.01); *A22C 2013/0053* (2013.01); *A22C 2013/0059* (2013.01); *A22C 2013/0063* (2013.01); *A22C 2013/0073* (2013.01); *A22C 2013/0083* (2013.01); *A22C 2013/0089* (2013.01); *B32B 2307/518* (2013.01); *B32B 2307/724* (2013.01); *B32B 2439/70* (2013.01)

(58) Field of Classification Search
  CPC .......... A22C 13/0013; A22C 2013/002; A22C 2013/0059; A22C 2013/0089; A22C 2013/0073; A22C 2013/0063; A22C 2013/0053; A22C 2013/0083; A22C 2013/003; B32B 27/08; B32B 27/34; B32B 2307/518; B32B 2307/724; B32B 2439/70

See application file for complete search history.

(56) References Cited

U.S. PATENT DOCUMENTS 3,582,364 A    6/1971   Rose et al.
2005/0106294 A1*    5/2005   Stalberg ............. A22C 13/0013
                                                    426/135

FOREIGN PATENT DOCUMENTS

DE    34 47 026 A1    7/1985
DE    101 47 155 A1   4/2003
DE    103 02 960 A1   8/2004
DE    103 30 762 A1   2/2005
DE    103 39 801 A1   3/2005
DE    20 2004 021 408 U1   1/2008
EP    1 380 212 A1   1/2004
EP    3 014 996 A1   5/2016
GB    887 466 A   1/1962
WO    02/078455 A1   10/2002

OTHER PUBLICATIONS

European Search Report, Patent No. 19153278.7.
G. Effenberger, Wursthüllen—Kunstdarm [Sausage casings—artificial skin], Holzmann-Buchverlag, Bad Wörishofen, 2nd edn. [1991] pp. 21-27.
German Search Report, 10 2018 201 241.5, priority application.

* cited by examiner

*Primary Examiner* — Michael C Miggins
(74) *Attorney, Agent, or Firm* — ProPat, LLC; Vinisha Joshi

(57) ABSTRACT

A tubular, seamless, water vapour permeable, smokable, biaxially draw-oriented and partially or completely heat-set food casing is provided having at least two layers based on thermoplastic polymers. At least one layer A, which does not form the inside layer, comprises a blend of aliphatic (co) polyamide and at least one hydrophilic polymer, while the inside layer I comprises a blend of aliphatic or isocyclic (co)polyamide and a block copolymer selected from polyether-amide, polyether-ester and polyether-urethane. The casing is produced by a tubular-film blowing process or a process with biaxial tubular-film draw-orientation. The casing is envisaged more particularly as synthetic sausage casing, especially for smoked raw sausage, such as salami.

16 Claims, No Drawings

SMOKE- AND WATER VAPOUR-PERMEABLE FOOD CASING WITH OPTIMIZED BONDING PROPERTIES

CROSS-REFERENCE TO RELATED APPLICATIONS

This application claims priority to German Patent Application 10 2018 201 241.5 filed Jan. 26, 2018, which is hereby incorporated herein by reference in its entirety.

FIELD OF THE INVENTION

The invention relates to a tubular, seamless, water vapour permeable, smokable, biaxially draw-oriented and partially or completely heat-set food casing having at least two layers based on thermoplastic polymers. The casing is highly permeable to smoke and water vapour and also has adhesion properties with respect to the filling that can be tailored. The food casing can be used as synthetic sausage casing, more particularly for air-dried, optionally smoked raw sausage, especially for salami.

BACKGROUND OF THE INVENTION

Smoked and/or dried sausage products are traditionally produced using casings based on regenerated cellulose or on collagen. Production of these casings, however, is technically complex. Cellulose casings, for instance, are produced generally by the viscose process. In this process, cellulose is first converted, using sodium hydroxide solution and carbon disulfide ($CS_2$), into cellulose xanthogenate. The resultant solution, called the viscose solution, must first age for several days before being passed to the skin-spinning machines. These machines consist essentially of a spinneret die, precipitation baths, wash baths and preparation baths, and also drying stations. In the precipitation baths, the cellulose xanthogenate is regenerated to form cellulose. Collagen skins—also referred to as hide fibre skins consist of hardened connective tissue protein. In production of such skins, connective tissue from animal hides is first mechanically comminuted and chemically digested. The homogenized mass formed in this process is then processed further in a dry or wet spinning process. In the wet spinning process, the collagen mass, after extrusion through an annular die, is consolidated in a coagulating precipitation bath (G. Effenberger, Wursthüllen—Kunstdarm [Sausage casings—artificial skin], Holzmann-Buchverlag, Bad Wörishofen, $2^{nd}$ edn. [1991] pp. 21-27).

As an alternative to the aforesaid casings, casings permeable to smoke and to water vapour and based on synthetic polymers have been described and introduced into the market.

EP 1 380 212 A1 describes (drawn) casings comprised of a mixture of a copolyamide (PA6/66, 85:15) and a cross-linked N-vinylpyrrolidone polymer ("PVPP"). In the examples of EP '212, the fraction of PVPP in the mixture is varied from 4 to 50%. Values reported for the water vapour permeability are in the range 1000 to S 2000 $g/m^2$ 24 h, measured at 40° C. and 90% rh. Additionally reported is the weight loss for sausage fillings after 15 days and after 2 months. The figures for a cellulose fibre casing are reported for comparison. The weight loss of the sausage in cellulose fibre casings after 15 days was substantially higher than in the case of the casings comprised of copolyamide and PVPP.

DE 103 30 762 A1 discloses a food casing which is permeable for smoke and water vapour and is impregnated on the food-contact side with liquid smoke. The casing consists of a mixture comprising a) at least one aliphatic polyamide and/or aliphatic copolyamide and b) at least one thermoplastifiable other polymer or copolymer. An embodiment according to DE '762 pertains to a multi-layered, seamless, biaxially oriented and thermoset, tubular film, wherein the inner layer of the multi-layered casing, i.e. the food contact layer, comprises at least one aliphatic polyamide and/or copolyamide and at least one other thermoplastifiable polymer.

Known from DE 20 2004 021 408 U1 is a smokeable, flat or tubular, bi-directionally oriented food casing or casing film based on polymers. The casing or film may be single- or multi-layered, wherein the layer(s) are made up of a polymer mixture comprising polyamide or a mixture of polyamide, polyvinyl alcohol and polyether-block-amide.

WO 09/078455 A1 describes films for the smoking and/or drying of foods, consisting of a polyamide matrix with a finely dispersed hydrophilic component. The latter component, for example, is a (co)polymer of N-vinylpyrrolidone, vinyl alcohol, or polyethylene glycol. In the polyamide matrix, the hydrophilic component is in the form of domains having a diameter of 0.1 to 3 μm in the plane of the film. The examples disclose biaxially drawn casings having water vapour permeabilities in the range from 211 to 509 $g/m^2$ 24 h, measured at 30° C. and 65% rh. Stated for comparison is a collagen casing ("Cutisin") having a permeability of 1200 $g/m^2$ 24 h under the same conditions.

DE 103 02 960 A1 claims a biaxially oriented, smoke permeable casing which comprises aliphatic polyamide or copolyamide and at least one water-soluble synthetic polymer and which has a water vapour permeability in the range from 40 to 200 $g/m^2$ d. The water-soluble polymer is preferably a polyvinyl alcohol, a polyalkylene glycol, a vinylpyrrolidone (co)polymer, a polymer of N-vinylalkylamides or a (co)polymer having units of α,β-unsaturated carboxylic acids or α,β-unsaturated carboxamides. The examples specify casings having a water vapour permeability in the range from 81 to 110 $g/m^2$ d, measured at 23° C. and 85% rh.

The water vapour permeabilities stated in the aforesaid specifications were measured under different ambient conditions and are not comparable with one another. In EP 1 380 212 A1 and WO 09/078455 A2, the cellulose fibre casing or collagen casing, respectively, employed for comparison shows that this latter casing is distinctly superior in terms of water vapour permeability to each of the polyamide-based casings claimed.

A general deficiency of the casings described above is their strong adhesion to the filling, i.e. in particular to the sausage meat. The strong adhesion can be explained on the basis of the polyamides, which form the matrix in all of these skins and which therefore determine the surface properties. The amide groups contained in polyamides are chemically analogous to the amide groups of the meat protein. Both kinds of amide groups are able to develop hydrogen bonds to one another, these bonds being energetically favoured and forming forces of adhesion at the polyamide/protein interface.

Adhesion to the sausage meat is frequently likewise high for casings based on regenerated cellulose. With these casings, surface modifications have long been usual in order to reduce the polarity of the cellulose surface and/or to tailor it to the specific application. Customarily, the insides of these casings are treated with a reactive water repellent, which binds chemically to the hydroxyl groups of the cellulose. Common reactive water repellents are, for example, alkyldiketenes and chromium-fatty acid complexes (see, among others, GB 887 466 A, U.S. Pat. No. 3,582,364 A and DE 34 47 026 A1).

For the user, strong adhesion to the sausage meat is a disadvantage, since it makes it difficult or even impossible for the casing to be peeled away. Very low adhesion is likewise undesirable; it may lead to the "lifting" of the casing from the meat surface during sausage manufacture and, consequently, to the accumulation of meat juice or to mould growth in the space between sausage and casing. In order to cover all application scenarios for smoked and/or dried sausage products, the user requires a range of casings with graduated adhesion.

SUMMARY OF ADVANTAGEOUS EMBODIMENTS OF THE INVENTION

The object which arises, accordingly, is that of providing a permeable polymeric casing with tailorable adhesion of the inner surface to the sausage meat filling. At the same time, the casing ought to meet the technical requirements governing the manufacture of smoked and/or dried sausage products—specifically, burst resistance, temperature stability, dimensional conformity, and high smoke permeability and water vapour permeability. The casing, furthermore, ought to be inexpensive and easy to manufacture.

The object has been achieved with a tubular casing which has one or more layers based on a mixture of aliphatic (co)polyamide and one or more hydrophilic polymers, and a further layer disposed on the inside of the casing and based on a mixture of aliphatic (co)polyamide and a block copolymer of the polyether-amide, polyether-ester or polyether-urethane type. The adhesion can be adjusted via the mixing ratio of the polymers used for the inside layer.

DETAILED DESCRIPTION OF ADVANTAGEOUS EMBODIMENTS OF THE INVENTION

A subject of the invention, therefore, is a seamless, tubular, at least two-layer, water vapour permeable and smoke-permeable, biaxially draw-oriented and partially or completely heat-set food casing having at least one layer A based on a blend of aliphatic (co)polyamide and one or more hydrophilic polymers, and a further layer I, located on the inner surface, which is based on a blend of aliphatic (co) polyamide and a block copolymer of the polyether-amide, polyether-ester or polyether-urethane type.

Surprisingly it has been found that layers comprised of blends of aliphatic (co)polyamides with block copolymers of the aforesaid types develop significantly lower adhesion to the sausage meat than do layers solely comprised of corresponding (co)polyamides.

The term "(co)polyamide" is used in connection with the present invention as an abbreviated designation for "polyamide and/or copolyamide". The aliphatic copolyamides include, among others, heterofunctional polyamides, examples being polyetheramides, polyesteramides, polyetheresteramides and polyamidourethanes. "(Meth) acrylic acid", "(meth)acrylamide" and so on stand for "acrylic acid and/or methacrylic acid" and for "acrylamide and/or methacrylamide", respectively.

Preferred among the aliphatic (co)polyamides are poly(ε-caprolactam), also referred to as PA 6, copolyamides of ε-caprolactam and ω-laurolactam (=PA 6/12), copolyamides of ε-caprolactam, hexamethylenediamine and adipic acid (=PA 6/66) and also copolyamides of ε-caprolactam, 3-aminomethyl-3,5,5-trimethylcyclohexylamine (isophoronediamine) and isophthalic acid. Particularly preferred are copolyamides of type PA 6/12 and PA 6/66. The layer A may therefore comprise not only aliphatic but also isocyclic or aromatic diamine or dicarboxylic acid units. "Isocyclic" compounds referred to as such here are those which contain a saturated carbon ring (e.g. isophoronediamine).

The casing has at least one layer A comprised of a blend comprising 60 to 95% by weight of one or more aliphatic (co)polyamides and 5 to 40% by weight of one or more hydrophilic polymers. The layer preferably consists of this blend and, optionally, the additives identified below, which are present therein in minor amounts. The fraction of additive(s) is generally not more than 10% by weight, preferably not more than 7% by weight, based in each case on the weight of the layer.

The hydrophilic polymer is preferably a) a polyvinylpyrrolidone (PVP) or a water-soluble copolymer having vinylpyrrolidone units and units of at least one α,β-olefinically unsaturated monomer,
b) a polyvinyl alcohol (PVAL) of the kind obtainable via partial or complete hydrolysis of polyvinyl acetate (PVAC), or a copolymer having vinyl alcohol units (for example a copolymer having units of vinyl alcohol and propen-1-ol),
C) a polyalkylene glycol, more particularly polyethylene glycol, polypropylene glycol or a corresponding copolymer having alkylene glycol units, especially ethylene glycol and/or propylene glycol units, and units of other monomers,
d) a polymer of N-vinylalkylamides, e.g. poly(N-vinylformamide), poly(N-vinylacetamide) or
e) a (co)polymer comprised of or having units of α,β-unsaturated carboxylic acids or α,β-unsaturated carboxamides, more particularly having units of (meth)acrylic acid and/or (meth)acrylamide.

Among these groups, a) is particularly preferred. Especially preferred is a PVP having a K value (according to Fikentscher) in the range from 12 to 50.

The blend optionally further comprises additives which enhance its thermoplastic processability and/or which influence the properties of the casing. Examples of properties which can be influenced are color, transparency, feel, tendency of the casing plies to block with one another, and the moisture storage capacity of the casing. To improve thermoplastic processability and transparency of the casing, organic polyhydroxy compounds are preferably used. Particularly preferred polyhydroxy compounds are ethylene glycol, propylene glycol, glycerol, diglycerol and pentaerythritol. Additives for influencing the other casing properties are, for example, polysaccharides such as starch or starch derivatives, inorganic fillers such as calcium carbonate, barium sulfate, talc, mica, etc., and color pigments.

The layer I, which is located on the inner casing surface and comes into contact with the food, comprises a blend of 40 to 90% by weight of one or more aliphatic (co)polyamides (as already defined) and 10 to 60% by weight of a block copolymer of the polyether-amide, polyether-ester or polyether-urethane type. The layer I preferably consists of this blend and optionally one or more of the additives specified below. This kind of block copolymer is understood to comprise chain molecules in which blocks (or segments) of aliphatic polyethers are incorporated. The polyether blocks are based in turn on aliphatic diols, preferably 1,2-ethanediol (→polyethylene glycol), 1,2-propanediol (→polypropylene glycol) or 1,4-butanediol (→polytetramethylene glycol, also called polyTHF). The rest of the segments are blocks of aliphatic polyamide (in the case of the polyether-amides) and/or blocks of part-aromatic polyester (in the case of the polyether-esters) and/or blocks of aromatic or aliphatic polyurethanes (in the case of the polyether-urethanes). The polyether blocks are arranged along the polymer chains in alternation to the blocks of polyamide and/or polyester and/or polyurethane, respectively, and are terminally bonded covalently to these blocks.

Block-co-polyether-amides of this kind are available commercially under the name PEBAX® (manufacturer: Arkema SA). Corresponding block-co-polyether-esters are sold under the name ARNITEL® (manufacturer: DSM). Corresponding block-co-polyether-urethanes are available, for example, under the name IROGRAN® A (manufacturer: Huntsman International LLC).

Particularly preferred are block-co-polyether-amides with blocks of polyethylene glycol and of poly(ε-caprolactam) and/or poly(ω-laurolactam), and also block-co-polyether-esters with blocks of polyethylene glycol and of polybutylene terephthalate.

The latter blend as well optionally comprises additives which influence the thermoplastic processability and/or the properties of the casing. These additives include, for example, agents which lower the tendency of the casing surfaces to block to one another, especially polysaccharides, and mineral fillers such as calcium carbonate, or dyes and/or pigments.

The total thickness of the casing wall is generally in the 15 to 80 μm range, preferably in the 25 to 50 μm range. The inside layer I generally has a thickness in the 2 to 12 μm range. It makes a contribution generally of 3 to 25%, preferably of 5 to 15%, to the total thickness of the casing wall. The food casing preferably consists of one or two layers A and the inside layer I. If two layers A are present, then they preferably have different compositions.

The casing of the invention is optionally colored with dyes and/or pigments, which are added to one or more of the aforesaid blends.

The food casing of the invention preferably has a water vapour permeability of 80 to 220 g/m² d, more preferably of 100 to 180 g/m² d, measured according to DIN 130 15106-3 with a moisture gradient from 85 to 0% and at a temperature of 23° C. The casing, moreover, is smokable, or permeable to smoke constituents. This means that coloring and aromatizing substances of the kind which occur in gaseous or condensed smoke, formed by charring of wood, are able to diffuse through the casing in quantities that are relevant to practice.

The casing of the invention is manufactured in accordance with the principle of thermoplastic coextrusion in combination with a tubular-film blowing process or with a process of biaxial tubular-film draw-orientation.

The casing obtained in the case of the tubular-film blowing process is referred to in the context of the invention as "undrawn" tubular film. This refers to tubular films which at the shaping stage are extended in the melt state, but not at temperatures below the crystallization temperature or below the softening temperature in the case of amorphous materials. In this case, the two or more annularly coextruded melts lying one against the other are extended by blowing in the peripheral direction (transverse direction) and by means of driven pinch rolls in the longitudinal direction. Since deformation takes place directly from the melt, the degree of orientation of the polymer chains is small and negligible. The films in this case are called unoriented films.

In the case of biaxial draw-orientation, a tubular film of relatively high wall thickness is produced initially by coextrusion of the two or more melts. This tubular film is inflated only to a small extent or not at all. This so-called primary tubular film is then cooled rapidly. In a subsequent step, the primary tubular film is heated to the temperature needed for biaxial draw-orientation, and is then drawn in the transverse and longitudinal directions by means of a gas pressure which acts from the inside and by means of driven pinch rolls. In this operation, a high degree of orientation of the polymer chains in both directions is achieved. Longitudinal and transverse draw ratios are within the range that is generally customary in practice. They are guided primarily by the nature of the (co)polyamides used.

The biaxial draw-orientation is usefully followed by a partial or complete heat-setting. This allows the shrinkage of the casing to be set to the desired level. Draw-oriented polymeric sausage casings generally exhibit shrinkage of less than 25% in the longitudinal and transverse directions, preferably of 8 to 20% in the longitudinal and transverse directions, when placed in 90° C. water for 1 minute. For heat setting, the casing is preferably inflated, by a volume of gas introduced between two pairs of pinch rolls, and is passed through a tunnel heated with IP emitters or hot air.

The overall process is also referred to within technical circles as a "double bubble" or "triple bubble" process.

The casing produced by the tubular film blowing process preferably has a thickness of 40 to 150 μm, and the casing produced with biaxial draw-orientation preferably has a thickness of 20 to 75 μm. For use as sausage casing, the variant produced with biaxial draw-orientation is preferred.

The casing of the invention may subsequently be further processed into sections tied off at one end, or in sections to form what are called shirred sticks. They may also be shaped into what is called a ring skin. For that purpose, the casing is inflated, charged asymmetrically with hot air or with radiant heat, and converted into a helical geometry by means of a ring tool.

The examples which follow serve for elucidation, with no limiting character on the scope of the invention. Percentages are percentages by weight, unless otherwise indicated or obvious from the context.

Starting materials used were as follows:
Aliphatic polyamides:
PA1: polyamide 6/66 having a relative viscosity of 4.0 (measured in 96% sulfuric acid) and a crystallite melting temperature of about 195° C. (ULTRAMID® C40 L 07 from BASF SE)
PA2: polyamide 6 having a relative viscosity of 4.0 (measured in 96% sulfuric acid) and a crystallite melting temperature of about 220° C. (ULTRAMID® B40 from BASF SE)
Hydrophilic polymer:
PVP: pulverulent polyvinylpyrrolidone having a Fikentscher K value of 16-17.5 (measured in water) (PLASDONE® K-17 from Ashland Inc.)
Polyether block copolymers:
PEA polyether-amide, comprised of blocks of polyethylene glycol and poly (6-laurolactam) and with a crystallite melting temperature of about 158° C. (PEBAX® MV 3000 SP 01 from Arkema SA)
PEE polyether-ester, comprised of blocks of polyethylene glycol and polybutylene terephthalate and with a crystallite melting temperature of about 185° C. (ARNITEL® VT 3118 from DSM Engineering Plastics BV)
PA-AB masterbatch of finely ground quartz and polyamide 6, weight ratio 10:90 (GRILON® XE 3690 from Ems-Chemie AG)

Inventive Example 1

Production of a Compound of Polyamide and Polyvinylpyrrolidone

PA1 and PVP were metered in a mass ratio of 85% to 15% into a commercial twin-screw extruder (barrel diameter 25 mm, L/D ratio 36, 12 barrels, feed points for pellets in barrel 1 and for powders in barrel 7, with two-hole extrusion die, manufacturer: Coperion GmbH). At a screw speed of 200 rpm and with heating in the range from 120° C. to 210° C., the polyamide was melted and was blended with the PVP to form a plastic compound. The transparent extrudate emerging from the die was cooled by immersion in a water bath and, after having solidified, was chopped with a strand chopper to form granular pellets. The pellets were dried in a forced air dryer at about 100° C. The pellets are referred to below as Comp. 1.

Inventive Example 2

Production of a Triple-Layer, Biaxially Oriented Casing

The components according to Table 1 below were supplied to the three extruders of a commercial coextrusion and tubular film drawing unit (double bubble unit with 3-layer coextrusion annular die). In the extruders, the components were melted, homogenized to form blends, and conveyed in the direction of the die. In the die, the melt flows were pressed axially through annular channels and brought together concentrically. The melt film emerging from the annular gap was shaped by means of a calibrator to form a primary tubular film with a diameter of 13 mm, which was cooled to room temperature. The primary tubular film was then heated again to about 80° C. and drawn in the transverse and longitudinal directions by means of an introduced cushion of air. The draw ratios were 3.30 in transverse direction and 1.95 in longitudinal direction. After drawing, the tubular film was passed through pinch rolls, then subjected to a second cushion of air, and guided through a setting tunnel equipped with IR emitters. Here, the tubular film attained a surface temperature of about 150° C. Lastly, the tubular film was pinched off again, cooled in the flat state and wound up. The casing formed had a diameter of 43 mm and a film thickness of 28 to 32 μm.

TABLE 1

| Extruder | Components supplied Designation | % by weight | Proportional layer thickness [%] |
|---|---|---|---|
| A | Comp. 1 | 85 | 10 |
|  | PA2 | 10 |  |
|  | PA-AB | 5 |  |
| B | Comp. 1 | 100 | 80 |
| C → inner layer | PA2 | 80 | 10 |
|  | PEA | 15 |  |
|  | PA-AB | 5 |  |

Inventive Example 3

Inventive Example 2 was repeated, except that extruder C was charged with components according to Table 2 below.

TABLE 2

| Extruder | Components supplied Designation | % by weight |
|---|---|---|
| C → inner layer | PA2 | 65 |
|  | PEA | 30 |
|  | PA-AB | 5 |

Inventive Example 4

Inventive Example 2 was repeated, except that extruder C was charged with components according to Table 3 below.

TABLE 3

| Extruder | Components supplied Designation | % by weight |
|---|---|---|
| C → inner layer | PA2 | 75 |
|  | PEE | 20 |
|  | PA-AB | 5 |

Inventive Example 5

Inventive Example 2 was repeated, except that extruder C was charged with components according to Table 4 below.

TABLE 4

| Extruder | Components supplied Designation | % by weight |
|---|---|---|
| C → inner layer | PA2 | 55 |
|  | PEE | 40 |
|  | PA-AB | 5 |

Comparative Example 1 (C1)

Inventive Example 2 was repeated, except that extruder C was charged with components according to Table 5 below.

TABLE 5

| Extruder | Components supplied Designation | % by weight |
|---|---|---|
| C → inner layer | PA2 | 65 |
|  | Comp. 1 | 30 |
|  | PA-AB | 5 |

Comparative Example 2 (C2)

Inventive Example 2 was repeated, except that extruder C was charged with components according to Table 6 below.

TABLE 6

| Extruder | Components supplied Designation | % by weight |
|---|---|---|
| C → inner layer | PA2 | 95 |
|  | PA-AB | 5 |

Comparative Example 3 (C3)

Production of a Single-Layer, Biaxially Oriented Casing

The components according to Table 7 below were supplied to the extruder of an extrusion and tubular film drawing unit (double bubble unit with 1-layer extrusion annular die). In the extruder, the components were melted, homogenized, and conveyed in the direction of the die. In the die, the melt flow was pressed axially through an annular channel. The melt film emerging from the annular gap was shaped by means of a calibrator to form a primary tubular film with a diameter of 14 mm, which was cooled to room temperature. The primary tubular film was then heated again to about 80° C. and drawn in the transverse and longitudinal directions by means of an introduced cushion of air. The draw ratios were 3.07 in transverse direction and 2.15 in longitudinal direction. The further steps took place in analogy to Inventive Example 2. The seamless casing formed had a diameter of 43 mm and a film thickness of 23 to 28 μm.

TABLE 7

| Extruder | Components supplied Designation | % by weight |
| --- | --- | --- |
| A → total layer | PA2 | 10 |
|  | Comp. 1 | 85 |
|  | PA-AB | 5 |

To assess the casings, measurements were made of the water vapour permeability under laboratory conditions, and application-related testing was performed. The latter provided information on the permeability of the casings under real-life conditions and about the adhesion to the filling. The filling was raw sausage (salami). The results are compiled in Table 8.

The procedure for the application-related testing was as follows:

Sections of casing were filled, at constant filling pressure, with commercial salami sausage filling, then sealed at the ends with metal clips and weighed. The filled casings were hung in a conditioning chamber and brought to fermentation, maturation and drying, using a temperature and humidity profile customary for salami. The total residence time in the conditioning chamber was 14 days. Subsequently, measurements were made of the change in weight of each sausage. To test the adhesion of the casings to the sausage surface, the sausages were divided into slices with a thickness of about 2 cm. The casing lying on the slices was severed axially. At the point of separation, the casing was lifted and peeled off manually in the circumferential direction. An assessment was made according to a scale of ratings from 1 to 10:

1=no adhesion at all; casing can be peeled off without force, no adhesions to meat

. . .

5=distinct adhesion: casing can be peeled off with moderate application of force, minimal adhesions to meat

. . .

10=very strong adhesion: peeling requires high force, and relatively large pieces of meat are torn out at the same time

TABLE 8

| Test results | | | |
| --- | --- | --- | --- |
| Example | Water vapour permeability[1] [g/m² d] | Weight loss of filled sausage | Rating for peeling behaviour |
| I2 | 142 | 21 | 3 |
| I3 | 175 | 22 | 1 |
| I4 | 118 | 17 | 4 |
| I5 | 138 | 20 | 2 |
| C1 | 181 | 23 | 9 |
| C2 | 19 | 6 | 6 |
| C3 | 219 | 25 | 10 |

[1] measured according to ISO 15106-3 with a moisture gradient of 85% to 0% relative humidity and at 23° C.

The above data confirm that the casings with an inside layer comprised in accordance with the invention have only low to moderate adhesion to the salami filling. For the casings where the layer on the inside has a prior-art composition, in contrast, the adhesion is at a medium to high level. The data further demonstrate that the moisture permeability of the casings of the invention is at approximately the same level as for prior-art casings (C3).

That which is claimed:

1. Tubular, seamless, water vapour permeable, smokable, biaxially draw-oriented and partially or completely heat-set food casing having at least two layers based on thermoplastic polymers comprising (i) at least one layer A which does not form the inside layer and comprises a blend of aliphatic (co)polyamide and at least one hydrophilic polymer and (ii) an inside layer I comprising a blend of aliphatic or isocyclic (co)polyamide and a block copolymer selected from polyether-amide, polyether-ester and polyether-urethane,
    wherein said layer I comprises 40 to 90% by weight of one or more of said aliphatic (co)polyamides and 10 to 60% by weight of said block copolymer.

2. Food casing according to claim 1, wherein the hydrophilic polymer is polyvinylpyrrolidone, polyvinyl alcohol or a partially hydrolysed polyvinyl acetate, a copolymer having vinyl alcohol units, a polyalkylene glycol or a copolymer having alkylene glycol units, a polymer of N-vinylalkylamides or a homopolymer comprised of or a copolymer having units of α,β-unsaturated carboxylic acids or α,β-unsaturated carboxamides.

3. Food casing according to claim 1, wherein the aliphatic or isocyclic (co)polyamide is a polyamide 6, a copolyamide of ε-caprolactam and ω-laurolactam (PA 6/12), a copolyamide of ε-caprolactam, hexamethylenediamine and adipic acid (PA 6/66) or a copolyamide of ε-caprolactam, 3-aminomethyl-3,5,5-trimethylcyclohexylamine (isophoronediamine) and isophthalic acid.

4. Food casing according to claim 1, wherein the layer A comprises a blend of 60 to 95% by weight of one or more aliphatic (co)polyamides and 5 to 40% by weight of one or more hydrophilic polymers.

5. Food casing according to claim 1, wherein said food casing consists of the layer I and two layers A having different compositions.

6. Food casing according to claim 1, wherein the inside layer I has a thickness of 2 to 12 μm.

7. Food casing according to claim 1, wherein said food casing exhibits a shrinkage of less than 25% in longitudinal and transverse directions, when placed for one minute into water having a temperature of 90° C.

8. Food casing according to claim 1, wherein said food casing exhibits a shrinkage of 5 to 15% in longitudinal and transverse directions, when placed for one minute into water having a temperature of 90° C.

9. Food casing according to claim 1, wherein said food casing has a water vapour permeability of 80 to 220 g/m2 d, measured according to DIN ISO 15106-3 with a moisture gradient from 85 to 0% and at a temperature of 23° C.

10. Food casing according to claim 1, wherein said food casing has a diameter (calibre) of 28 to 90 mm and a wall thickness of 15 to 80 μm.

11. Food casing according to claim 10, wherein said food casing has a diameter (calibre) of 34 to 60 mm.

12. Method of producing a food casing according to claim 1 comprising coextruding in combination with either a tubular-film blowing process or a biaxial tubular-film draw-orientation process.

13. Method according to claim 12, wherein the method further comprises processing the food casing either into sections tied off at one end or into shirred sticks.

14. Synthetic sausage casing comprising the food casing according to claim 1.

15. Synthetic sausage casing as claimed in claim 14, wherein the sausage is air-dried and optionally smoked raw sausage.

16. Synthetic sausage casing as claimed in claim 14, wherein the sausage is salami.

* * * * *